United States Patent Office 3,554,982
Patented Jan. 12, 1971

3,554,982
POLY(AMIDE-IMIDES) FROM MALEOPIMARIC ACID AND DIAMINES
Paul H. Aldrich, Greenville, Del., assignor to Hercules Incorporated, Wilmington, Del., a corporation of Delaware
No Drawing. Filed Oct. 10, 1967, Ser. No. 674,124
Int. Cl. C08g 20/32
U.S. Cl. 260—78
3 Claims

ABSTRACT OF THE DISCLOSURE

Novel polymeric materials for use in the manufacture of ink are prepared from maleopimaric acid and diamines.

This invention relates to novel polymeric materials adapted particularly for use in the manufacture of ink.

The polymeric material of this invention are derived by polymerization and have recurring units of the following general formula

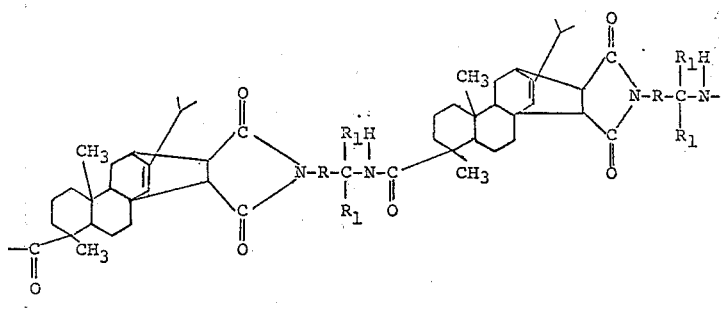

(I)

In Formula I R is selected from the group consisting of alkylene radicals having from 1 through 35 carbon atoms and cycloalkylene radicals. The alkylene radical can be straight chain or branched chain. $R_1$ is, independently of the other $R_1$, selected from the group consisting of hydrogen and $C_1$–$C_3$ alkyl.

Poly (amide-imides) is the term sometimes used hereinafter when reference is made to polymeric materials represented by Formula I.

Poly(amide-imides) are derived by polymerization of either the salt or the reaction product of maleopimaric acid, or a lower alkyl ester thereof, with a diamine. Maleopimaric acid and its lower alkyl esters are known in the art and are represented by the formula

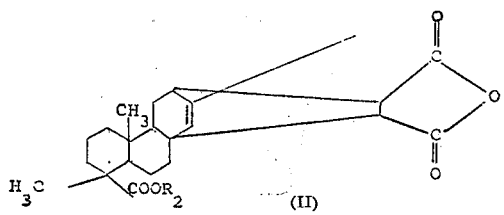

wherein $R_2$ is hydrogen or alkyl. When $R_2$ is hydrogen Formula II represents maleopimaric acid, and when $R_2$ is alkyl, such as methyl, ethyl, propyl, butyl and the like, Formula II is representative of the alkyl esters of maleopimaric acid which can be employed. Methods of preparing maleopimaric acid are disclosed and described in U.S. Pats. 2,359,980 and 2,409,930. A method of obtaining maleopimaric acid in essentially pure form is disclosed and described in U.S. Pat 2,628,226. Whenever maleopimaric acid is used hereinafter, it is intended to include the esters thereof.

The diamines which can be employed to prepare the poly(amide-imides) of this invention have the formula

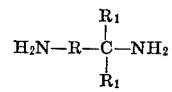

wherein R and $R_1$ are as hereinabove defined.

Examples of suitable diamines include ethylenediamine; trimethylenediamine; tetramethylenediamine; penetamethylenediamine; hexamethylenediamine; 1,2-propanedi amine; 1,2-butanediamine; 1,6-heptanediamine; 1,8-p-menthanediamine; 1,4-bis(aminomethyl) cyclohexane; 4-ethyl, 1,7-decanediamine; and the like.

Other diamines which can be used are available commercially as Dimer Diamine. Dimer Diamine consists of a mixture of diamine of the formula $NH_2$—$R_3$—$NH_2$, wherein $R_3$ contains 36 carbon atoms. Dimer Diamine has the following analysis:

Amine number[1]—193.
Iodine value—93.
Gardner color—6–7.
Viscosity, 30° C.—150 centipoise.
Specific gravity—0.889.

PREPARATION OF POLY(AMIDE-IMIDES)

Poly(amide-imides) are prepared by condensation polymerization of the salt of or the reaction product of maleopimaric acid with a diamine as hereinabove defined.

In preparing the poly(amide-imides) of this invention from the salt of maleopimaric acid and a diamine, the maleopimaric acid is first dissolved in a low boiling solvent such as ethanol, propanol or acetone to provide a solution. Suitable weight ratios of solvent to maleopimaric acid are about 4/1 and higher. A diamine is then admixed with the solution of maleopimaric acid to form the reaction mass. The mole ratio of diamine to maleopimaric acid should be from about 1:1 or higher. Reaction takes place at room temperature (about 22° C.). The reaction mass can be heated as high as about 150° C.; however, reaction rate is relatively fast at room temperature, reaction time being on the order of several minutes. The resulting product is a salt of maleopimaric acid and the diamine employed. This salt precipitates as a white solid from the reaction mass and is separated from the solvent by conventional means such as filtration or centrifugation.

The poly(amide-imides) are derived by polymerization of the salt described. The salt is heated above is melting point to initiate polymerization. The temperature range in which polymerization takes place is from about 200° C. to about 300° C., the preferred temperature range being from about 250° C. to about 300° C. Water is formed during the polymerization reaction. Vacuum can be applied to aid in water removal. The resinous polymer

[1] Mg KOH equivalent to 1 gram of amine.

recovered has a light amber color and has a molecular weight range of from about 866 to about 50,000.

The poly(amide-imides) can also be prepared from the reaction product of maleopimaric with a diamine. This reaction product is sometimes referred to hereinafter as an amino-imide. The conditions under which the production of amino-imide is favored over formation of the salt previously described are mole ratios of diamine to maleopimaric acid in excess of 2:1, and heating of the reaction mass consisting of maleopimaric acid, diamine, and solvent, at temperatures of 80° C.–150° C. for about 5–15 hours. The amino-imide formed during the reaction precipitates from solution, is filtered, washed and dried. The amino-imide can then be polymerized under the conditions utilized for polymerization of the salt of maleopimaric acid and the diamine.

The resinous polymers of this invention can also be produced without preparation of a specific isolated intermediate as above described. Utilizing this procedure maleopimaric acid is charged to a reaction vessel and heated above its melting point to about 250° C. Diamine is admixed with the molten maleopimaric acid. Water formed during the reaction is continuously removed. When no further water is being removed, the temperature of the reaction mass is raised to about 275° C., and vacuum is applied for several hours. The reaction mass is then cooled and the resinous polymer recovered.

The following examples illustrate preparation of the poly(amide-imides) of this invention. These poly(amide-imides) have the recurring unit in the polymer of the general Formula II

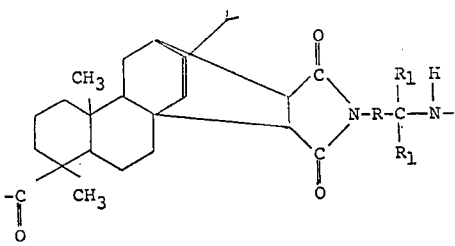

where R and $R_1$ define the same groups as represented for Formula I herein.

The following example is used to illustrate preparation of the salt formed by reaction of maleopimaric acid with a diamine.

Example 1

A hexamethylenediamine-maleopimaric acid salt is prepared by adding 64 parts of a 90% aqueous hexamethylene-diamine solution dropwise to a stirred solution of 200 parts of maleopimaric acid in 791 parts of acetone at room temperature (about 22° C.). A white solid forms and is washed with acetone and dried under vacuum. Two hundred forty-three (243) parts of this salt are recovered.

The following example illustrates preparation of poly (amide-imides) by polymerization of the salt prepared in Example 1.

Example 2

A reaction vessel, equipped with a nitrogen inlet and a reflux condenser, is charged with 140 parts of the hexamethylenediamine-maleopimaric acid salt prepared in Example 1. The reaction vessel is placed in a heating bath at 250° C. and the salt is heated and refluxed for 133 minutes to provide a reaction mass. The reflux condenser is then replaced with a vent and the temperature of the reaction mass is raised to 275° C. and held at this temperature for 1½ hours. At the end of this heating period the reaction mass is completely liquid. The temperature of the reaction mass is then raised to 280° C. and after 40 minutes the reaction vessel is evacuated to 0.5 mm. Hg. Heating at 275° C.–280° C. is continued for about two hours. The reaction vessel is then cooled. A resinous polymer is recovered which has a drop softening point of 210° C. and an acid number of 39.

The following example illustrates preparation of poly (amide-imides) by polymerization of the reaction product of maleopimaric acid and a diamine.

Example 3

A mixture comprised of 50 parts of the salt prepared in Example 1 and 200 parts of water is heated at 80° C. for 16 hours. A solid precipitate is formed. This precipitate is filtered, washed with water and dried under vacuum. About 42.5 parts of precipitate which is N-(6-aminohexyl)maleopimaric acid imide is recovered having a percent nitrogen (Kjeldahl) of 5.24% (theory, 5.6%).

About 18.8 parts of the amino-imide thus produced is charged to a reaction vessel under a nitrogen atmosphere. The charged reaction vessel is inserted in a heating bath at a temperature of 275° C. After two hours the amino-imide completely melts providing a reaction mass. Heating under a nitrogen atmosphere at 275° C. is continued for two hours and then vacuum (0.28 mm. Hg) is applied to the reaction mass. These conditions are maintained for about ten hours. The reaction mass is then cooled. A resinous polymer is recovered with an acid number of 25 and an amine number of 2.

The following example illustrates a one-step process for preparation of poly(amide-imides) from Dimer Diamine.

Example 4

A reaction vessel equipped with a stirrer, thermometer, and distillation head is charged with 141.5 parts of Dimer Diamine. The Dimer Diamine is heated to 250° C. and about 100 parts of maleopimaric are added to the Dimer Diamine over a period of about 40 minutes to form a reaction mass. Following the maleopimaric acid addition, the temperature of the reaction mass is raised to 275° C. and held at that temperature for four hours. Vacuum is then applied (wtaer aspirator) and heating continued at 275° C. for one hour. The reaction mass becomes too viscous to stir. The reaction mass is cooled. A resinous copolymer is recovered which has an acid number of 20.3 and an amine number of 4.0.

The following example illustrates the preparation of a rotogravure ink utilizing the resinous polymer prepared in Example 2.

Example 5

About 15 parts of chrome yellow pigment is dispersed directly into about 60 parts of the resinous polymer prepared in Example 2, by use of a two-roller rubber mill. The resulting pigmented resin chips are dissolved in 75 parts of toluene. The resulting solution is a highly satisfactory rotogravure ink.

During the preparation of the poly(amide-imides) heretofore described, the polymerizing mass should be kept under an inert atmosphere to prevent oxidation to undesired side products.

Preparing the salt of the diamine and maleopimaric acid, or the amino-imide readily permits mixtures of the above to be polymerized to form copolymers.

It is to be understood that the above specification is illustrative of this invention, and not in limitation thereof.

What I claim and desire to protect by Letters Patent is:

1. A resinous polymer consisting essentially of recurring units of the formula

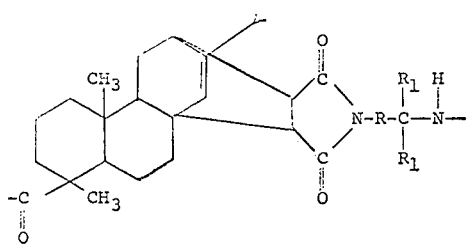

wherein R is selected from the group consisting of alkylene radicals having from 1–35 carbon atoms and cycloalkylene radicals, and $R_1$ is, independently of the other $R_1$, selected from the group consisting of hydrogen and $C_1$–$C_3$ alkyl.

2. The resinous polymers of claim 1 wherein R is $CH_2$ and $R_1$ is hydrogen.

3. The resinous polymers of claim 1 wherein R is $(CH_2)_5$ and $R_1$ is hydrogen.

References Cited

UNITED STATES PATENTS

| 2,540,776 | 2/1951 | Cadwell | 260—101 |
| 3,043,789 | 7/1962 | Cyba | 260—101 |
| 3,260,691 | 7/1966 | Lavin et al. | 260—78 |
| 3,347,828 | 10/1967 | Stephens et al. | 260—78 |

FOREIGN PATENTS

| 570,858 | 7/1965 | Great Britain | 260—78 |

HAROLD D. ANDERSON, Primary Examiner

U.S. Cl. X.R.

106—20, 32; 260—33.6, 37, 326.5